(No Model.) 5 Sheets—Sheet 1.
E. THOMAS.
BRIDGE.
No. 456,501. Patented July 21, 1891.
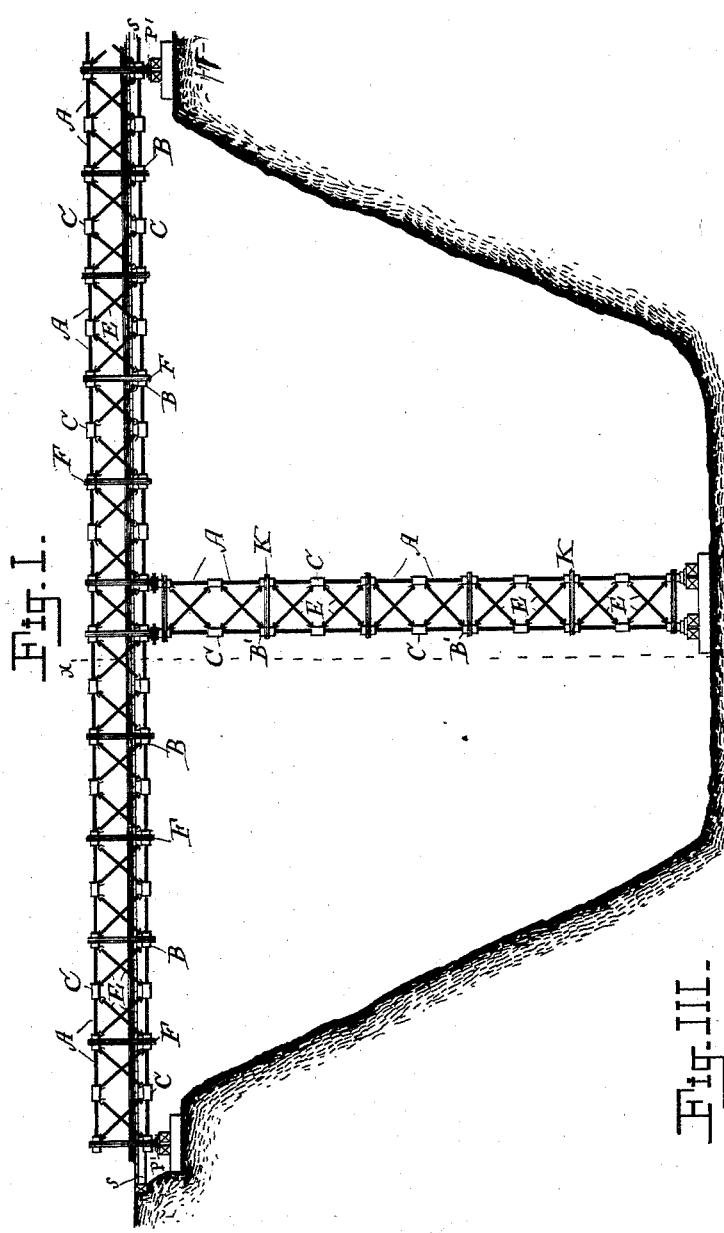
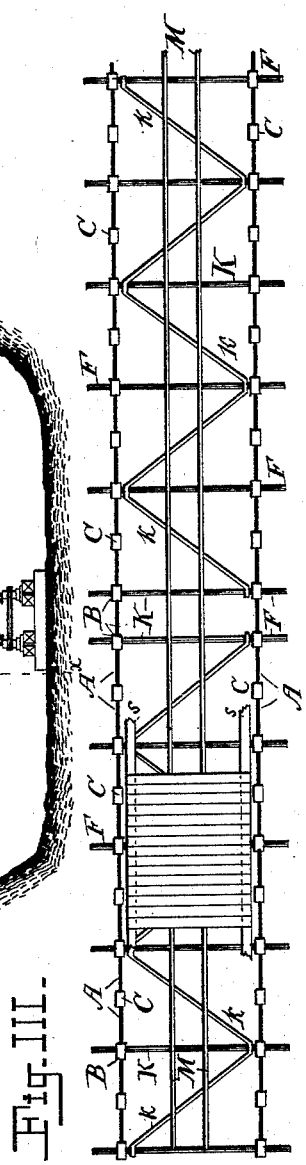
Witnesses:
Chas. W. Coolidge.
B. W. Sommers.
Inventor:
Emilien Thomas
pr. Henry Otts
Atty (No Model.)  E. THOMAS.  5 Sheets—Sheet 2.
BRIDGE.
No. 456,501.  Patented July 21, 1891.
Fig. II.
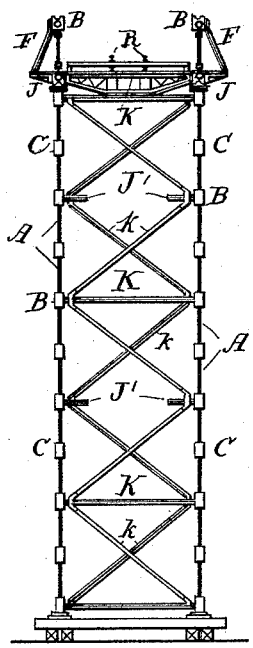
Fig. V.
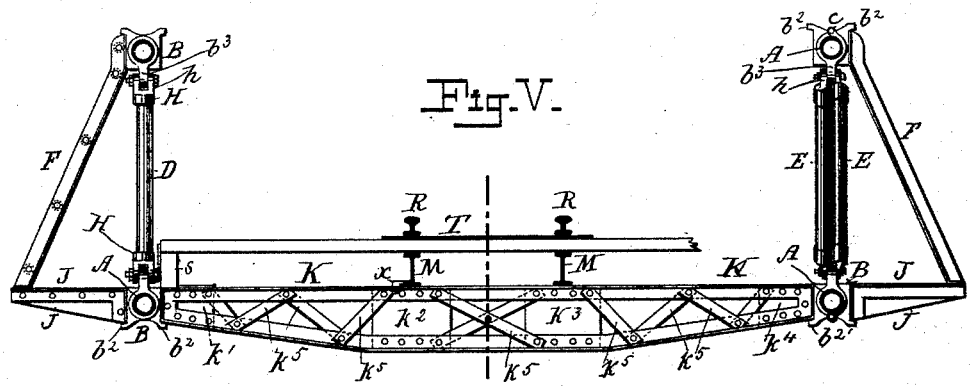
Witnesses:  Inventor:
Chas. W. Conboye  Emilien Thomas
B. W. Sommers  pr Newry Nls
 Atty.

(No Model.) 5 Sheets—Sheet 3.
E. THOMAS.
BRIDGE.
No. 456,501. Patented July 21, 1891.
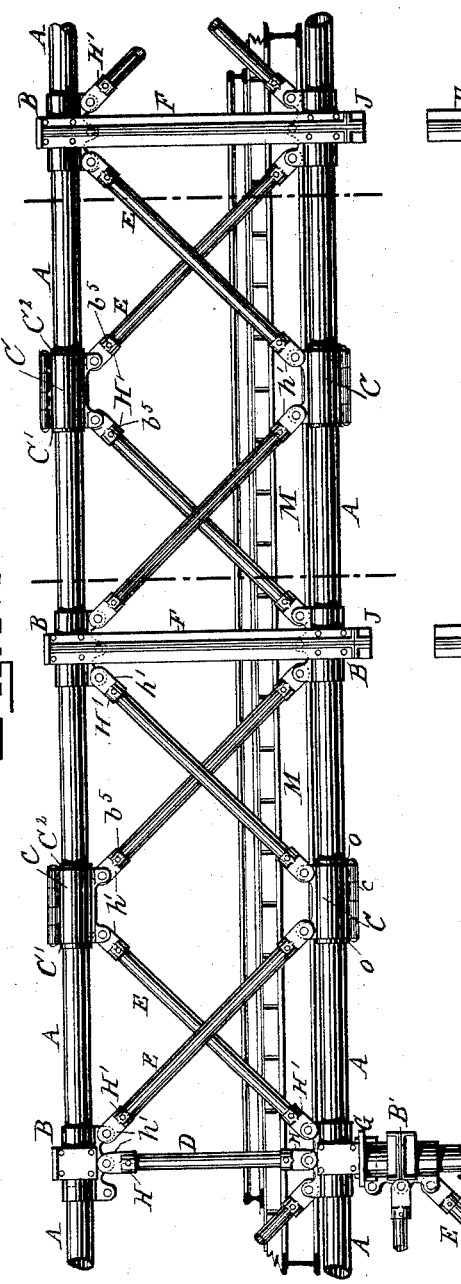
Fig. IV.
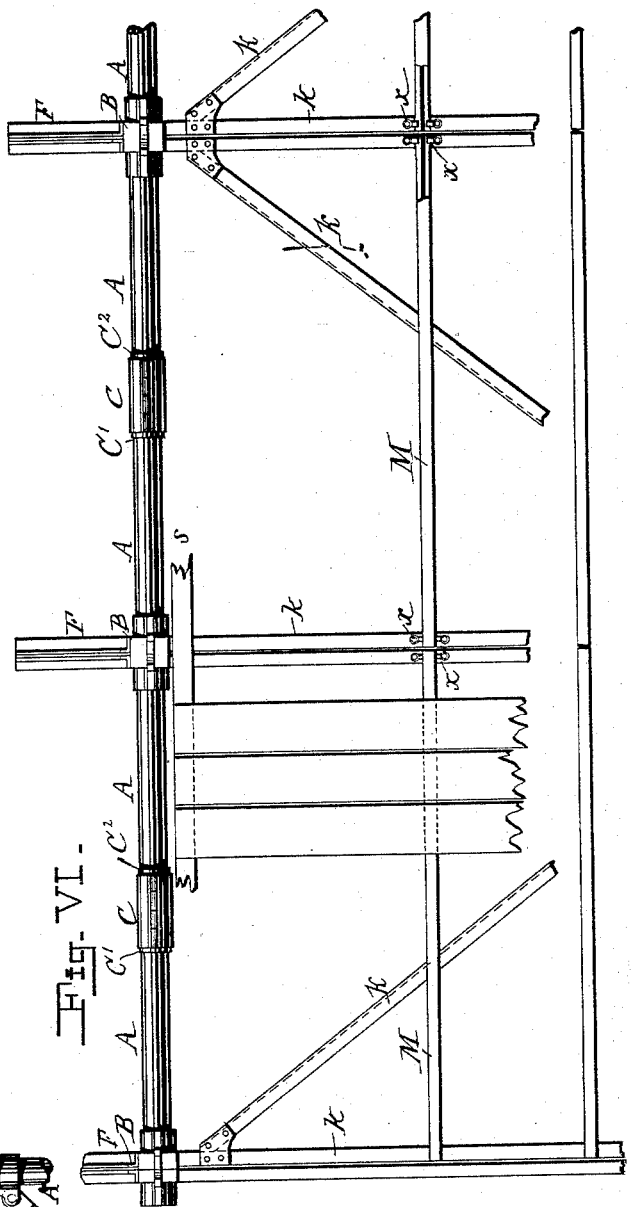
Fig. VI.
Witnesses:
Chas. W. Courboye.
B. W. Sommers.
Inventor:
Emilien Thomas
fr Henry Orr
Atty.

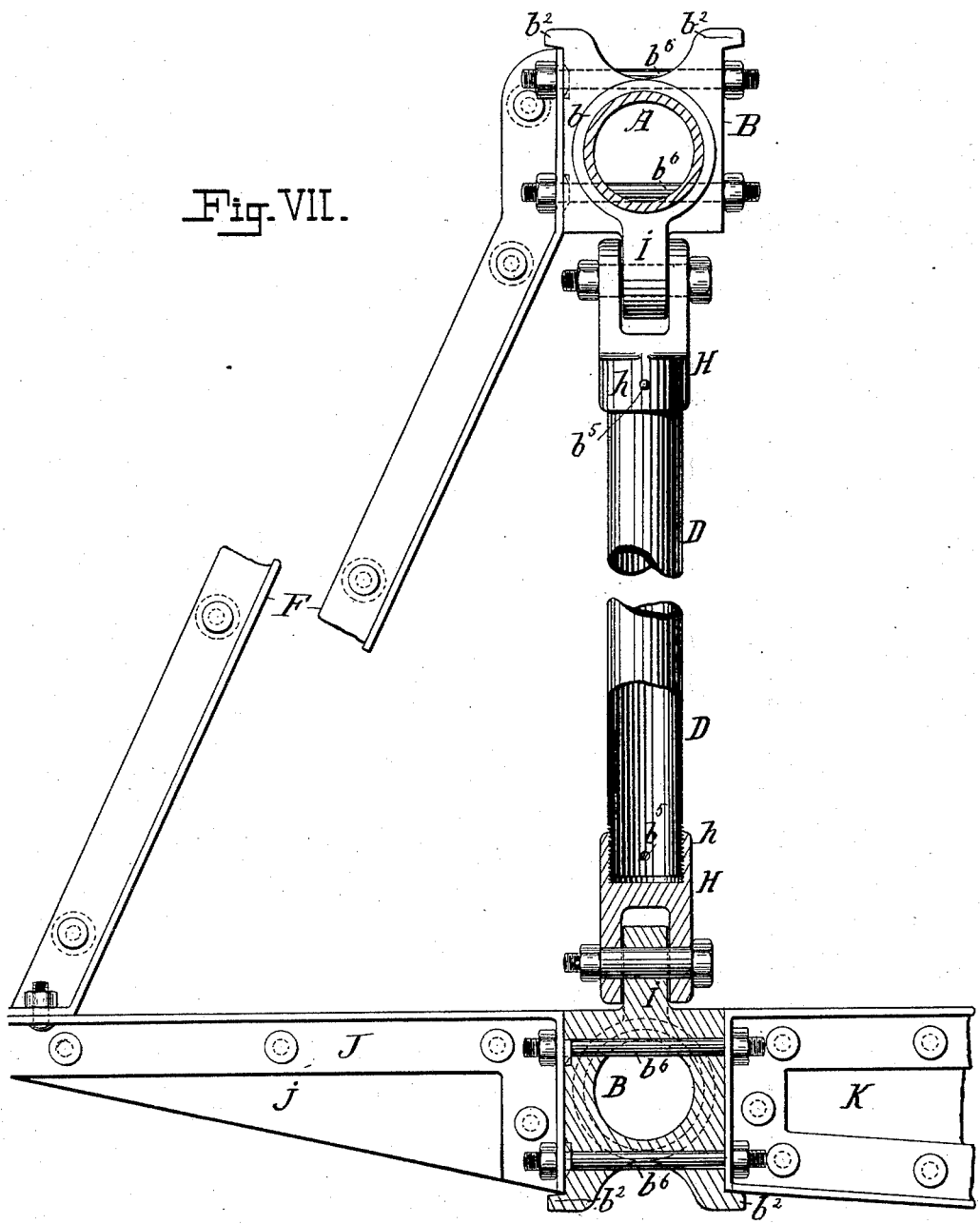

(No Model.)  5 Sheets—Sheet 5.
E. THOMAS.
BRIDGE.
No. 456,501. Patented July 21, 1891.
Fig. VIII.
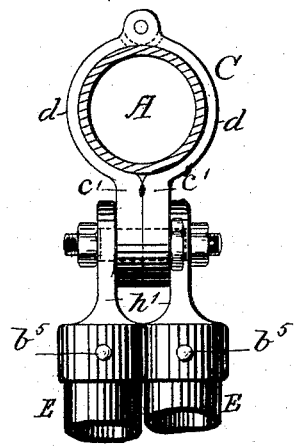
Fig. IX.
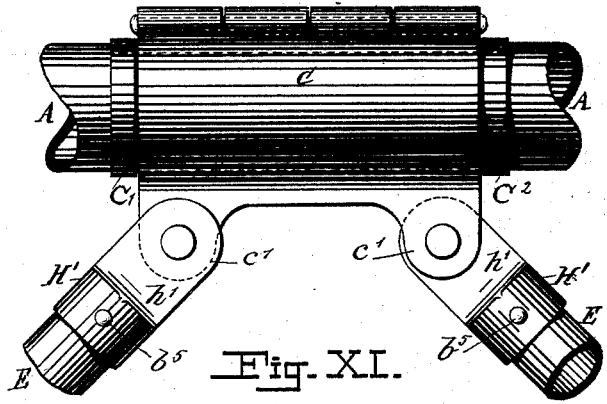
Fig. X.
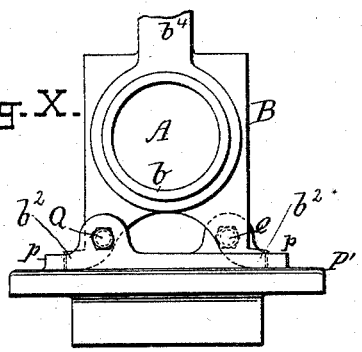
Fig. XI.
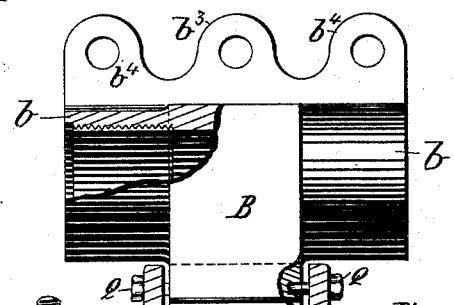
Fig. XIII.
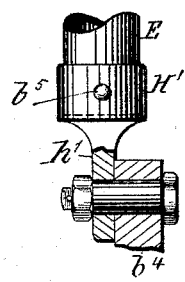
Fig. XII.
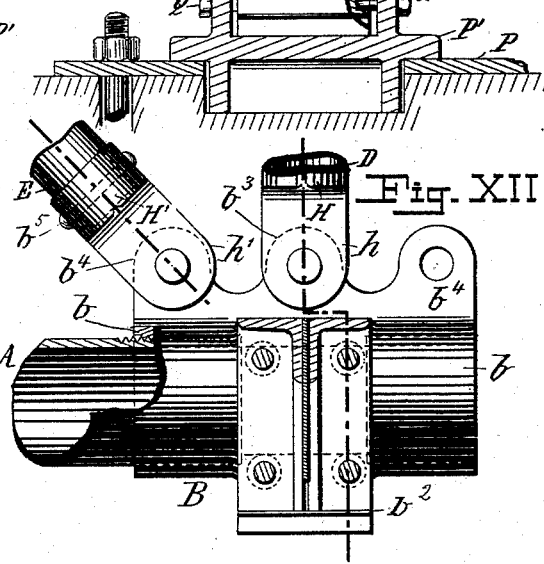
Witnesses:
Chas. W. Couloye.
B. W. Sommers.
Inventor:
Emilien Thomas
pr Henry Orth
Atty.

UNITED STATES PATENT OFFICE.

EMILIEN THOMAS, OF BRUSSELS, BELGIUM.

BRIDGE.

SPECIFICATION forming part of Letters Patent No. 456,501, dated July 21, 1891.

Application filed December 20, 1889. Serial No. 334,471. (No model.) Patented in Belgium April 25, 1889, No. 85,971; in France May 2, 1889, No. 197,904, and in England October 25, 1889, No. 16,885.

*To all whom it may concern:*

Be it known that I, EMILIEN THOMAS, a citizen of France, residing at Brussels, in Belgium, have invented certain new and useful Improvements in Bridges, (for which I have obtained Letters Patent in England, dated October 25, 1889, No. 16,885; in France, dated May 2, 1889, No. 197,904, and in Belgium, dated April 25, 1889, No. 85,971;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Referring to the accompanying drawings, Figure 1 shows in side elevation a bridge constructed according to my invention. Fig. 2 is a section thereof, taken on line $x\,x$ of Fig. 1. Fig. 3 is a top plan view of the floor-frame of the bridge, showing a portion of the flooring. Fig. 4 is a side elevation of a portion of the bridge and one of the pier-couplings. Fig. 5 is a cross-section of the bridge. Fig. 6 is a top plan view of a portion of the floor-frame and flooring. Fig. 7 is a vertical sectional elevation of one of the uprights or standards, illustrating the mode of applying the outer angle-braces and cross girders or sills; and Figs. 8 to 13 are detail views.

The invention has for its object the construction of a light yet strong iron bridge, and to construct such bridge of elements that may not only be used for the bridge itself, but also for the erection of the bridge-piers.

The invention has for its further object to so construct and combine the elements that constitute the bridge or pier or piers thereof that they may not only be easily handled and assembled or taken apart, but that they may be compactly stored or loaded on or in vehicles for transportation, so as to render the structure available either as a permanent roadway or for temporary use—as in warfare, for instance, or for other purposes where temporary bridges may be needed.

The invention consists in the use of comparatively short tubular sections for the construction of the stringers and piers and in the use of couplings of peculiar and novel construction for uniting or assembling the tube-sections.

The invention further consists in the combination, with the elements described, of lateral braces, cross-girts, and longitudinal sleepers for the roadway, whether the bridge is used as a railway-bridge or for ordinary traffic.

In the drawings I have illustrated a bridge of two spans adapted for use as a railway-bridge, the stringers of which are composed of two lattice-girders. The longitudinal girts of these stringers, as well as their vertical and cross or diagonal braces are constructed exclusively of comparatively short tubular sections, each stringer-section comprising two horizontal tubes A, two vertical braces or standards D, and four diagonal or lattice braces E, arranged in pairs in the form of an X.

The tubular sections A of the stringers have a right-hand screw-thread at one end and a left-hand screw-thread at the other, and are assembled by means of couplings B, which are polygonal in cross-section with a cylindrical axial aperture and provided at opposite ends with tubular bearings $b\,b$, having a right and left interior screw-thread, respectively, for the reception of the tube-sections A. The polygonal portion of the coupling B is provided along one edge at opposite sides with a ledge or flange $b^2$, and also with three perforated ears or lugs, of which the central lug $b^3$ serves for connecting the standards or vertical braces to the upper and lower girders of a stringer and the two other lugs $b^4$ for connecting the diagonal braces E to said girders. The vertical braces D are also screw-threaded at both ends, and preferably with a right-hand thread at one end and a left-hand thread at the other, each end being screwed into a sleeve H, on which is formed a forked lug $h$, by means of which and suitable bolts and nuts said braces are connected to the ears $b^3$ of the couplings B. (See detail view, Fig. 7.)

The diagonal or lattice braces E, like the vertical braces D, are also threaded at opposite ends, as described, and screwed into a sleeve H′, on which is formed a perforated lug or ear $h'$, one of said sleeves being connected by suitable bolt and nut with one of the lugs $b^4$ of the couplings B of the upper and lower girders of the stringer, respectively, the sleeve H' at the opposite end of the said diagonal brace being bolted to one of two lugs $c'$, formed on a coupling-sleeve C, so that the two braces of a pair will cross each other, or, in other words, the brace connected with the coupling B of the lower girder is connected with the coupling C of the upper girder, and vice versa. (See Fig. 4.)

The connecting or coupling sleeves C are preferably constructed of two half-sleeves hinged together and having each two perforated lugs or ears formed on their free meeting edge, so that when the sections are closed together they will form the lugs or ears $c'$. (See detail view, Figs. 8 and 9.) By means of the described construction the coupling-sleeves C can be firmly clamped upon and readily removed from the tube-sections A.

Instead of the coupling-sleeve described, a tubular sleeve adapted to be slipped upon the tube A may be used, and to prevent endwise displacement the sleeve may be shrunk onto the tube A; or abutments may be provided to prevent such endwise displacement—as, for instance, a ring C' may be driven or shrunk on the tube-sections A, as shown in Fig. 9, on the right side of the coupling C, or said tube-sections may have cast thereon an annular abutment or flange $C^2$, as shown on the left side of said coupling in said Fig. 9. On the other hand, the tubes A may be screw-threaded on opposite sides of the space destined for the sleeve-coupling C, and a lock-nut may be screwed up to said sleeve from both sides, or any other suitable means may be provided to lock the sleeve-couplings C against longitudinal motion on the tube-sections A, and these means may be employed with the hinged sleeves to prevent accidental displacement. Finally, the sleeves may be dispensed with and the perforated lugs or ears $c'$ may be cast on the tube A itself without greatly increasing its bulk and weight. I prefer, however, a detachable sleeve-coupling, for the reason that such coupling can be adjusted to the tube-section when assembling the parts, which cannot be done when the sleeve is shrunk onto the tube or the ears $c'$ are formed thereon. The tube in this case must be adjusted in its coupling B to bring the ears $c'$ into proper position, which is not as desirable.

If found desirable or necessary, the tubular elements may be more effectually locked to the couplings or to the devices for coupling the same by means of locking-bolts $b^5$. (See detail views, Figs. 8, 9, 12, and 13.)

The stringers are braced against lateral motion by means of braces F, made, preferably, of angle-iron, two such braces being usually bolted together to form a T-brace, which is bolted to a coupling B of the upper girder or rail and to a bracket J, that is bolted to a coupling B of the lower girder, as more clearly shown in Fig. 7, the upper end of the brace F abutting against the flange $b^2$, formed on the polygonal portion of the coupling B of the upper girder, while the inner end of the bracket J rests upon the like flange on the coupling B of the lower girder. The lower girders of the stringers are connected by cross-girders K, each preferably composed of two flanged iron beams of substantially a T shape in cross-section bolted together and suitably trussed, according to the strain to which they are subjected. These trussed girders are bolted to the inner face of two couplings B of the lower girder, with their inner ends resting upon the flanges $b^2$ thereof, as more plainly shown in Figs. 5, 6, and 7, there being two such cross-girders for each stringer-section—namely, one for each pair of couplings B of the two lower stringer-girders. The cross-girders K are further braced together by diagonal braces $k$, Figs. 3 and 6.

On each side of the roadway are laid longitudinal timbers or sleepers $s$, to which the bridge-flooring is secured where such flooring is desired, and centrally of the bridge below the flooring are laid metallic sleepers M, preferably of I shape, to strengthen the flooring and support the rails for the railway-track. The longitudinal I-beams are therefore laid at the proper distance apart, so as to directly support the rails R, which latter are, as usual, secured to cross-ties T, bolted to the bridge-floor, as shown in Fig. 5, thus forming a strong road-bed. The sleepers M are of about the same length as the tubes A, and are secured to the cross-girders K, and to facilitate their removal they are secured in position by means of clamping-irons $x$, pivotally connected with said girders K, so that they may be readily driven onto or off the foot-flanges of said sleepers M, as more clearly shown in Fig. 6. The couplings B at the extreme ends of the lower stringer-girders are seated on box bearers or sills P', supported by or in bearing-plates P, bolted to cross-beams laid on the ground at the bridge ends, the couplings B being adjustable on the sills by means of set-bolts Q, as shown in Figs. 10 and 11, so as to provide for expansion and contraction.

The bridge pier or piers are constructed substantially like the stringers of tube-sections A, connected to couplings B', of a construction substantially like that of the couplings B. The columns, which may here be called "stringers," set on end, are braced together on opposite sides by means of diagonal braces E, connected to the couplings B' of the columns and to intermediate couplings C, and also by means of cross-girts K, bolted to the couplings B', as shown in Fig. 1. At the front and rear sides of the pier the columns are braced or trussed together by means of cross-girts K and brackets J', bolted alternately to the couplings B', the said brackets J' projecting inwardly and being connected to the cross-girts K by angle trusses or braces $k$, (see Fig. 2,) the same as in the bridge-floor, thus forming a lattice-pier of great strength.

In practice the cross-sectional area of the pier is equal to one-half of a stringer-section, though it may be of the same cross-sectional area, the four vertical braces or standards D of such half-section forming, practically, a continuation of the four columns of the pier, so that the parts employed in the construction of the bridge may be employed in the construction of the pier, and by simply adding or removing one or more sections piers of any desired height may be constructed. In fact, the construction of a pier involves simply the construction of a bridge without the flooring and set on end, except that the brackets J' project inwardly instead of outwardly and serve as a means for bracing together two columns—i. e., stringers of the piers—by means of the angle trusses or braces k.

When the bridge is intended for temporary use, the braces J may be constructed of two angle-irons j and two correspondingly-shaped pieces of sheet iron or steel bolted together, (see Figs. 5 and 7,) and in this use of the bridge I preferably secure the bolts $b^6$ to the couplings B or B', in order to expedite the work in putting up or taking down a temporary bridge, thereby saving the labor of packing or bundling the bolts separately for transportation, and then inserting them into the bolt-holes for the purpose of assembling the parts. The cross-girts K may also be constructed of angle-irons of I shape in cross-section and of sheet-iron or sheet-steel or plates, such as shown at $k'$ $k^2$ $k^3$ $k^4$, Fig. 5, so as to practically form a lattice-girder with the diagonal braces or trusses $k^5$.

In the example given in the drawings the bridge is supposed to be of a length of twenty meters, or ten meters for each span, and of a height of ten meters with a track of 0.60 meters in width and a total width from center to center of the stringers of about 2.750 meters. In such a structure the stringer and pier sections A may be of a length of two meters and of a diameter of about 0.100 meter, the clear diameter and the thickness of metal of the tubular elements varying according to the load the bridge is to support. Inasmuch as the longitudinal I girders or sleepers M are comparatively light and easily handled, I preferably make them in sections of two and four meters, respectively, though they may all be made of the same length as the stringer-sections. Of course the above dimensions are given as an example only. As a rule, however, all the tubular elements of the pier or stringer sections, irrespective of their couplings, are of the same length and diameter, whatever these may be, so as to adapt them for indiscriminate use in the construction of the bridge, which can readily be done in view of the fact that the stringer and brace couplings or the sleeves screwed to the braces are all of uniform construction, and can therefore be used indiscriminately with the tubular elements.

The advantages I claim for a bridge of the described construction are as follows: lightness and great strength, facility of construction or erection and demolition, the possibility and facility of increasing or decreasing the length of the bridge and of the height of the pier or piers by the use of the same elements in both structures, simplicity of construction of the elements of which the bridge is composed, and, finally, the use of elements that are not liable to deformation either in handling or in transportation, that can be readily handled, readily stored or loaded on cars or wagons, and taking up a very small space as compared with the usual bridge materials.

Having described my invention, what I claim, and desire to secure by Letters Patent, is—

1. A bridge stringer or pier consisting of four girders arranged in pairs and composed of tubular sections, couplings for connecting the tubular sections, said couplings being provided with perforated lugs or ears, and coupling-sleeves mounted on the girder-sections, also provided with perforated lugs or ears, in combination with lattice braces or trusses having at each end a perforated lug or ear for connection with the girder-couplings and with the couplings on the girder-sections, substantially as and for the purposes described.

2. A bridge stringer or pier consisting of four girders arranged in pairs and composed of tubular sections, couplings for detachably connecting the said sections, said couplings being provided with perforated lugs or ears, and coupling-sleeves constructed of two half-sleeves hinged together with perforated lugs or ears, in combination with lattice braces or trusses having a perforated lug or ear at each end for connection with the girder-couplings and with the coupling-sleeves, substantially as and for the purposes specified.

3. A bridge stringer or pier consisting of four girders arranged in pairs and composed of tubular sections screw-threaded at their opposite ends, interiorly-threaded couplings for coupling said sections, said couplings having perforated lugs or ears, and coupling-sleeves also provided with perforated lugs or ears mounted on the tubular stringer-sections intermediate of the couplings of said sections, in combination with tubular lattice braces or trusses provided at each end with a perforated lug or ear for connection with the girder-couplings and with the coupling-sleeves thereon, substantially as and for the purposes specified.

4. The combination, with the girder-section A, of a coupling-sleeve mounted thereon and having perforated lugs or ears $c'$, and a stop on the said section at opposite ends of the sleeve to lock the same against endwise motion, for the purposes specified.

5. The combination, with the tubular lattice braces or trusses E, provided at each end with a sleeve H', having perforated lug or ear h', of the tubular sections A of the stringer-girders, the coupling-sleeves B, and the coupling-sleeves C, said sleeves C being constructed of two parts hinged together and provided with the perforated lugs c' for connecting the ends of the braces E to the stringer-girders, as set forth.

6. A bridge-stringer or pier-section consisting of two girders composed of tube-sections, couplings for uniting the said sections, said couplings being of polygonal form in cross-section and provided with a flange $b^2$, and suitable braces or trusses for bracing the girders, in combination with the brackets J, bolted to the couplings of one of the girders and resting on said flange $b^2$, and braces connected with the bracket and connecting the other girder of the stringer, substantially as described.

7. A bridge stringer or pier consisting of two girders composed of tube-sections, couplings for uniting said sections, said couplings being of polygonal form in cross-section and provided with a flange $b^2$, and suitable braces for bracing the girders, in combination with the brackets J, bolted to the couplings of one of the girders and resting upon said flange $b^2$ thereof, and a brace E, bolted to the bracket and to the couplings of the other girder of the stringer and abutting against the flange $b^2$ of the said couplings thereof, substantially as and for the purpose specified.

8. The combination, with the couplings B and the upper girder of the bridge-stringer, of the brackets J, constructed of angle-irons $j$ and a sheet-metal web, and the braces F, connected with the brackets and couplings B, substantially as and for the purpose specified.

9. The combination, with the couplings B of the lower girders of the bridge-stringer, said couplings being provided with a flange along their inner lower edge, of the cross ties or girders K, seated on said flange and bolted to the couplings, substantially as and for the purposes specified.

10. The combination, with the couplings B of the lower girders of a bridge-stringer, said couplings being provided with a flange along their lower inner edge, of the cross ties or girders K, seated on said flange and bolted to the couplings, and the diagonal or lattice braces $k$ for connecting the cross-girders together and bracing the same, substantially as described.

11. The combination, with the couplings B of the lower girders of the bridge-stringer, and the cross ties or girders K, bolted to said couplings and seated on flanges formed thereon, of the longitudinal I-girders M, the cross-ties T, and rails R, substantially as and for the purposes specified.

12. The combination, with the couplings B of the lower girders of the bridge-stringers, and the cross ties or girders K, bolted to said couplings and seated upon flanges formed thereon, of the longitudinal I-girders M and the clamping-irons $x$, pivoted to the cross-girders K, substantially as and for the purposes specified.

13. The combination, with the couplings B of the lower girders of the bridge-stringers, and the cross ties or girders K, bolted to said couplings and seated on flanges formed thereon, of the longitudinal I-girders M, the clamping-irons $x$, pivotally connected with the cross-girders K, and the longitudinal floor-timbers $s$, of a height equal to that of the longitudinal girders M, substantially as and for the purpose specified.

14. The combination, with the tubular members of a bridge or pier, of the couplings B and C, cross-girts K, brackets J, and braces F and $k$, said parts being constructed substantially as and for the purposes set forth.

In testimony whereof I affix my signature in presence of two witnesses.

EMILIEN THOMAS.

Witnesses:
 HENRI RUDOT,
 EDOUARD LABOSQUE.